United States Patent
Hashimoto et al.

(10) Patent No.: US 9,960,644 B2
(45) Date of Patent: May 1, 2018

(54) CORE FOR ROTARY ELECTRIC MACHINE

(71) Applicant: MITSUBISHI ELECTRIC CORPORATION, Chiyoda-ku (JP)

(72) Inventors: Akira Hashimoto, Chiyoda-ku (JP); Atsushi Sakaue, Chiyoda-ku (JP); Hironori Tsuiki, Chiyoda-ku (JP); Yuji Nakahara, Chiyoda-ku (JP); Takashi Umeda, Chiyoda-ku (JP); Katsunori Oki, Chiyoda-ku (JP); Ryuichi Takiguchi, Chiyoda-ku (JP); Takanori Komatsu, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 273 days.

(21) Appl. No.: 14/784,430

(22) PCT Filed: May 28, 2013

(86) PCT No.: PCT/JP2013/064744
§ 371 (c)(1),
(2) Date: Oct. 14, 2015

(87) PCT Pub. No.: WO2014/192076
PCT Pub. Date: Dec. 4, 2014

(65) Prior Publication Data
US 2017/0077768 A1    Mar. 16, 2017

(51) Int. Cl.
*H02K 1/14* (2006.01)

(52) U.S. Cl.
CPC ......... *H02K 1/148* (2013.01); *H02K 2201/15* (2013.01)

(58) Field of Classification Search
CPC ....... H02K 1/14; H02K 1/148; H02K 2201/15
See application file for complete search history.

(56) References Cited

U.S. PATENT DOCUMENTS

| 6,226,856 B1 * | 5/2001 | Kazama | H02K 1/12 29/596 |
| 6,369,687 B1 * | 4/2002 | Akita | H02K 1/148 310/216.011 |

(Continued)

FOREIGN PATENT DOCUMENTS

| EP | 2 587 632 | 5/2013 |
| JP | 2000-201458 A | 7/2000 |

(Continued)

OTHER PUBLICATIONS

Office Action dated Nov. 22, 2016 in Japanese Patent Application No. 2016-005097 (with partial English language translation).

(Continued)

*Primary Examiner* — Naishadh Desai
(74) *Attorney, Agent, or Firm* — Oblon, McClelland, Maier & Neustadt, L.L.P.

(57) ABSTRACT

In a core for a rotary electric machine, first end portions of back yoke portions are linked to second end portions of back yoke portions of adjacent core segments so as to be rotatable around pivot portions. Each of the core segments is configured by alternately laminating first core segment sheets and second core segment sheets. The pivot portions are constituted by interfitting protruding portions that are formed on the first core segment sheets. The core segments are displaceable relative to the adjacent core segments between a contracted position in which spacing between the magnetic pole tooth portions is contracted and an expanded position in which spacing between the magnetic pole tooth portions is expanded, when the core segment linked body is opened out rectilinearly.

11 Claims, 21 Drawing Sheets

(56) References Cited

U.S. PATENT DOCUMENTS

| | | | |
|---|---|---|---|
| 7,120,985 B2 * | 10/2006 | Nouzumi | H02K 1/148 29/596 |
| 9,099,897 B2 * | 8/2015 | Neuenschwander | B23P 11/005 |
| 2004/0222715 A1 * | 11/2004 | Yamamura | H02K 1/148 310/216.015 |
| 2005/0229383 A1 | 10/2005 | Yamamura et al. | |
| 2010/0066193 A1 | 3/2010 | Noda | |
| 2012/0248928 A1 | 10/2012 | Hashimoto et al. | |

FOREIGN PATENT DOCUMENTS

| | | |
|---|---|---|
| JP | 2001-103690 A | 4/2001 |
| JP | 2002-281697 A | 9/2002 |
| JP | 2002-320351 A | 10/2002 |
| JP | 2003-235187 A | 8/2003 |
| JP | 2004-274914 A | 9/2004 |
| JP | 2010-98938 A | 4/2010 |
| JP | 2011-19360 A | 1/2011 |
| JP | 2012-65546 A | 3/2012 |
| WO | WO 2011/125199 A1 | 10/2011 |
| WO | WO 2011/161806 A1 | 12/2011 |
| WO | WO 2012/095987 A1 | 7/2012 |

OTHER PUBLICATIONS

International Search Report dated Sep. 3, 2013, in PCT/JP2013/064744 filed May 28, 2013.

* cited by examiner

CORE FOR ROTARY ELECTRIC MACHINE

TECHNICAL FIELD

The present invention relates to a construction of an armature core that is used in a rotary electric machine, and a particular object thereof is to improve productivity, material yield, and characteristics, etc., of the armature core.

BACKGROUND ART

In conventional cores for rotary electric machines, a plurality of core segments that have an approximate T shape that has a back yoke portion and a magnetic pole tooth portion that protrudes from the back yoke portion are linked circumferentially. Each of the core segments is configured by laminating a plurality of core segment sheets. When manufacturing cores, material yield is improved by arranging the core segments in a staggered pattern such that the magnetic pole tooth portions are positioned between magnetic pole tooth portions of second core segments and punching out two straight rows together (see Patent Literature 1 and 2, for example).

CITATION LIST

Patent Literature

[Patent Literature 1]
International Publication No. WO/2011/125199
[Patent Literature 2]
International Publication No. WO/2012/095987

SUMMARY OF THE INVENTION

Problem to be Solved by the Invention

In the conventional core that is disclosed in Patent Literature 1, notches in which magnetic pole tooth portion tips of the first core segments are accommodated are disposed on magnetic pole tooth portion roots of the second core segments in order to implement punching two staggered straight rows together. Because of that, if the notches are enlarged, it leads to reductions in driving torque or deterioration of torque pulsation (torque ripples), etc.

In the conventional core that is disclosed in Patent Literature 2, because a construction is adopted in which the magnetic pole tooth portions are split and separated in order to implement punching two staggered straight rows together, labor time for manufacturing (pressing) the core are increased. The pressing die is also increased in size, leading to increases in costs. In addition, because it is necessary to assemble and fix the split magnetic pole tooth portions, productivity is reduced.

The present invention aims to solve the above problems and an object of the present invention is to provide a core for a rotary electric machine that can improve material yield, and that can improve productivity, without lowering characteristics of the rotary electric machine, even if widths of magnetic pole tooth portions are increased.

Means for Solving the Problem

In order to achieve the above object, according to one aspect of the present invention, there is provided a core for a rotary electric machine including a core segment linked body that is formed by linking a plurality of core segments that each include: a back yoke portion; and a magnetic pole tooth portion that protrudes from a central portion of the back yoke portion, wherein: each of the back yoke portions includes: a first end portion on which a pivot portion is disposed; and a second end portion; the first end portions of the back yoke portions are linked to the second end portions of the back yoke portions of adjacent core segments so as to be rotatable around the pivot portions; each of the core segments is configured by alternately laminating first core segment sheets and second core segment sheets; the pivot portions are constituted by a plurality of interfitting protruding portions that are formed on the first core segment sheets; the core segments are displaceable relative to the adjacent core segments between a contracted position in which spacing between the magnetic pole tooth portions is contracted and an expanded position in which spacing between the magnetic pole tooth portions is expanded, when the core segment linked body is opened out rectilinearly; and the interfitting protruding portions fit into first interfitting apertures that are disposed on the second core segment sheets when the core segments are in the expanded position, and fit into second interfitting apertures that are disposed on the second core segment sheets and are positioned by the second interfitting apertures when the core segments are in the contracted position.

Effects of the Invention

In a core for a rotary electric machine according to the present invention, because the core segments are displaceable between an expanded position and a contracted position relative to the adjacent core segments, punching two staggered straight rows of core segment linked bodies together can be easily achieved by manufacturing the core segment linked bodies with the core segments positioned in the expanded position, and material yield can be improved, enabling productivity to be improved, without lowering characteristics of the rotary electric machine, even if widths of magnetic pole tooth portions are increased.

DESCRIPTION OF EMBODIMENTS

Preferred embodiments of the present invention will now be explained with reference to the drawings.

Embodiment 1

Figure 1:
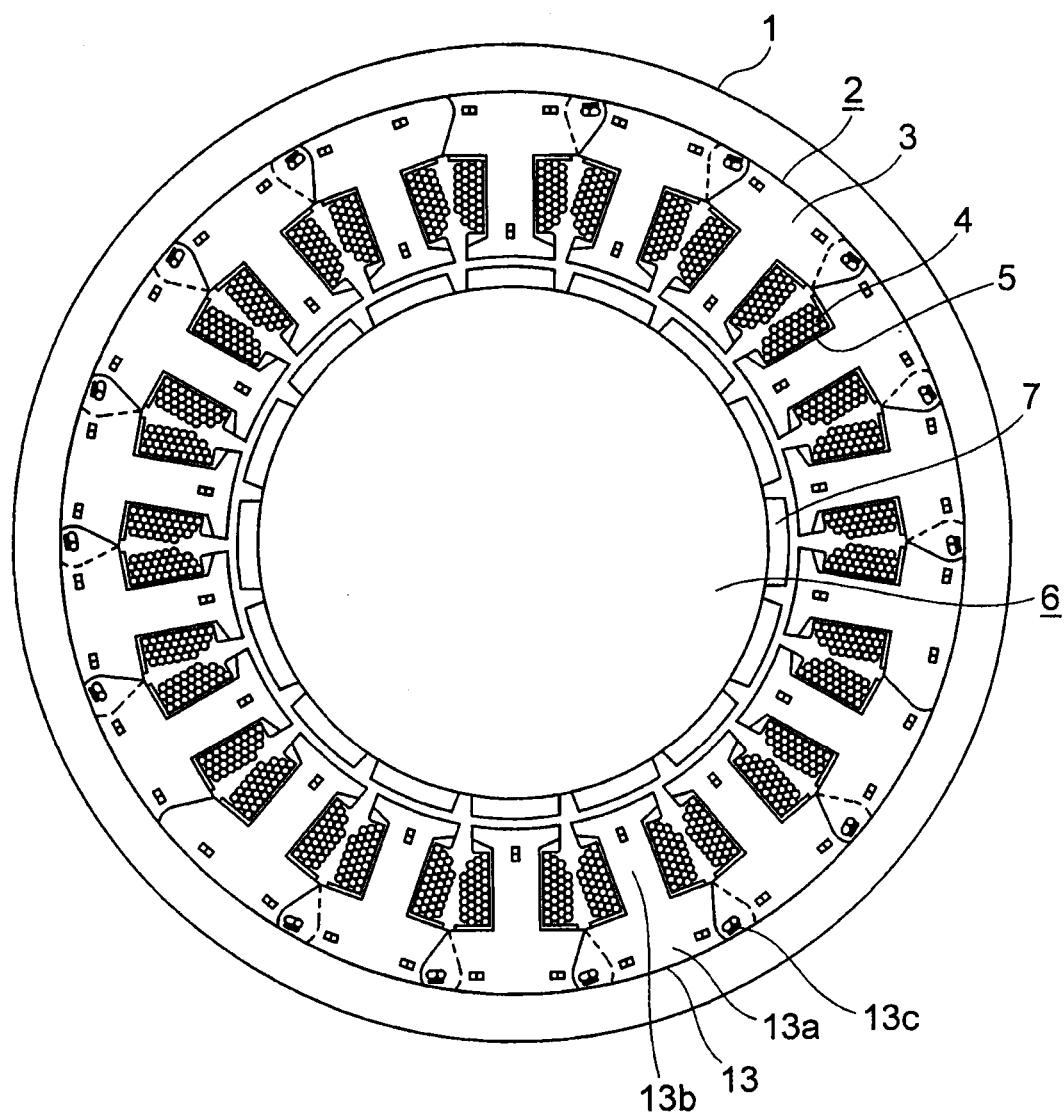
FIG. 1 is a plan that shows a rotary electric machine according to Embodiment 1 of the present invention.

FIG. 1 is a plan that shows a rotary electric machine according to Embodiment 1 of the present invention. In the figure, a cylindrical armature (stator) 2 is held inside a cylindrical housing 1. The armature 2 has: a core (laminated core) 3; a plurality of armature coils 4 that are wound onto the core 3; and a plurality of insulators 5 that are interposed between the core 3 and the armature coils 4.

A rotor 6 is disposed inside the armature 2. The rotor 6 is held by the housing 1 so as to be rotatable relative to the armature 2. The rotor 6 has: a plurality of permanent magnets 7 that are fixed to an outer circumferential portion thereof, and that face the armature 2.

Figure 2:
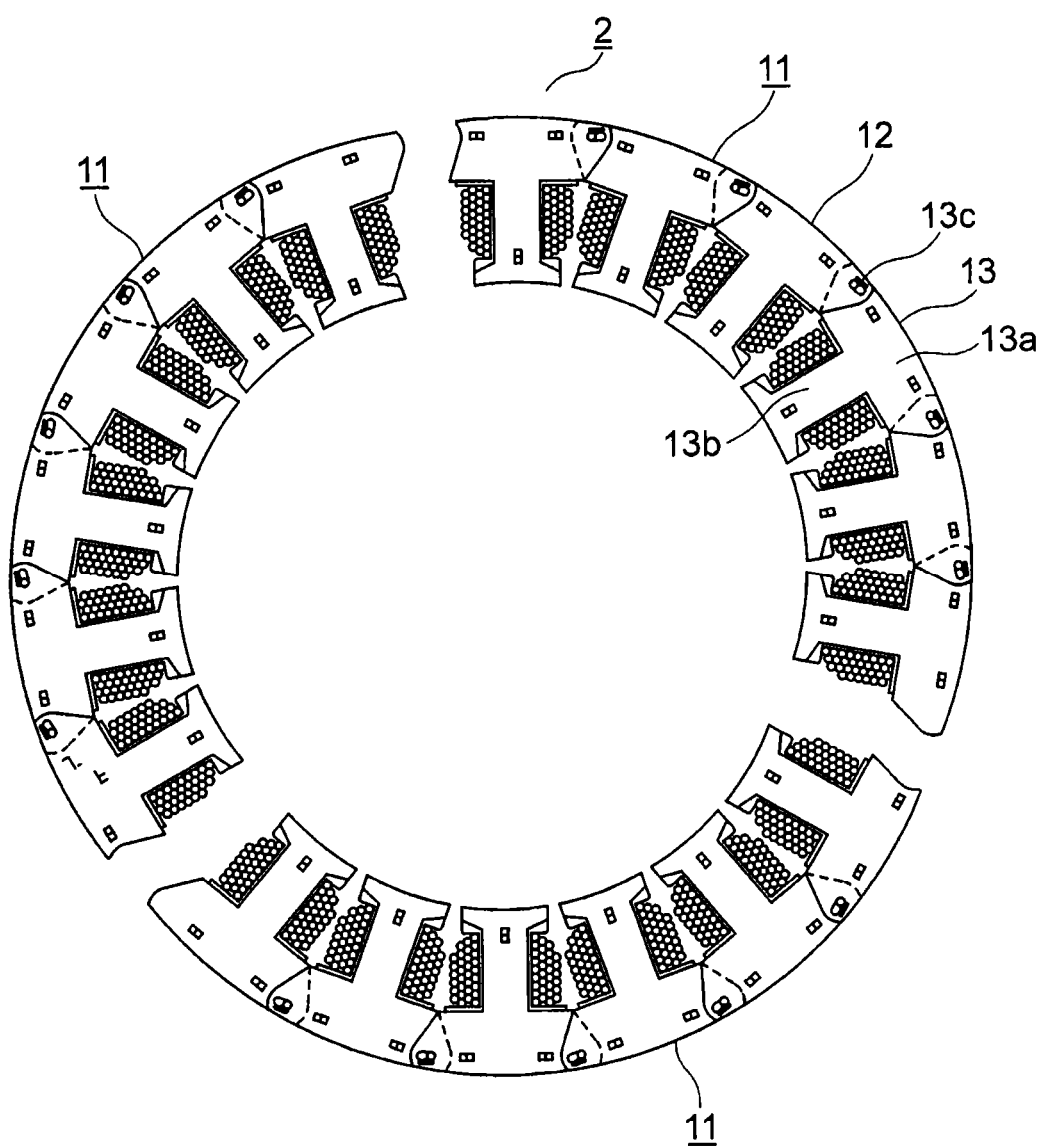
FIG. 2 is a plan that shows a state in which an armature from FIG. 1 is dismantled.

FIG. 2 is a plan that shows a state in which the armature 2 from FIG. 1 is dismantled. The armature 2 is configured by assembling a plurality of (in this example, three) circular arc-shaped armature segments 11 into an annular shape. Accompanying this, the core 3 is configured by assembling a plurality of (in this example, three) circular arc-shaped core segment linked bodies 12 into an annular shape. Each of the core segment linked bodies 12 is configured such that a plurality of (in this example, six) core segments 13 are linked in a circumferential direction of the armature 2.

Each of the core segments 13 has: a back yoke portion 13a that forms part of an annular yoke portion of the core 3; and a magnetic pole tooth portion 13b that protrudes toward a radially inner side of the core 3 from a central portion of the back yoke portion 13a, and onto which the armature coils 4 are wound.

The back yoke portion 13a has: a first end portion which is one end portion in a circumferential direction of the armature 2; and a second end portion which is another end portion. A pivot portion 13c is disposed on the first end portion of the back yoke portion 13a.

The first end portions of the back yoke portions 13a are linked to the second end portions of the back yoke portions 13a of adjacent core segments 13 so as to be rotatable around the pivot portions 13c. In other words, the core segments 13 are linked to the adjacent core segments 13 so as to be rotatable around the pivot portions 13c. The pivot portions 13c are disposed further outward in the radial direction of the armature 2 than intermediate portions of the back yoke portions 13a.

Figure 3:
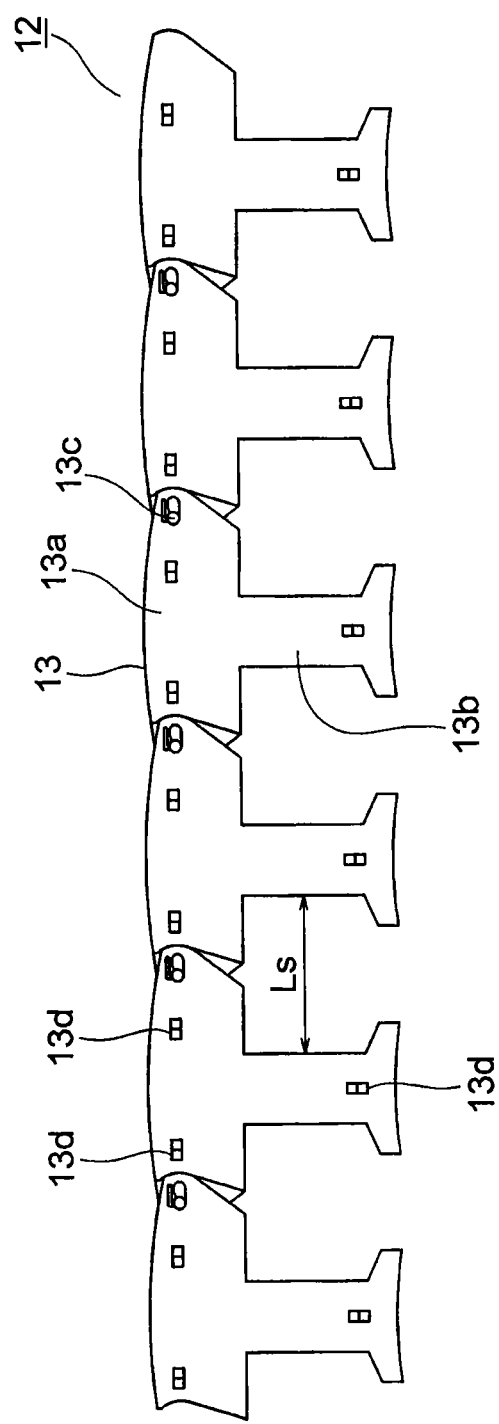
FIG. 3 is a plan that shows a state in which a core segment linked body from FIG. 2 is opened out rectilinearly.

Each of the core segment linked bodies 12 is expandable into a rectilinear shape such that the magnetic pole tooth portions 13b are parallel (or approximately parallel) to each other, as shown in FIG. 3.

When the core segment linked bodies 12 are opened out rectilinearly, the linked positions of the pivot portions 13c onto the adjacent core segments 13 are displaceable in a direction of arrangement of the core segments 13 (left and right in FIG. 3). Thus, spacing between the mutually adjacent magnetic pole tooth portions 13b is expandable and contractible between Ls, shown in FIG. 3, and Ls+δ, shown in FIG. 4.

In other words, the core segments 13 are displaceable relative to the adjacent core segments 13 between a contracted position (FIG. 3) in which the spacing between the magnetic pole tooth portions 13b is contracted, and an expanded position (FIG. 4) in which the spacing between the magnetic pole tooth portions 13b is expanded.

Figure 4:
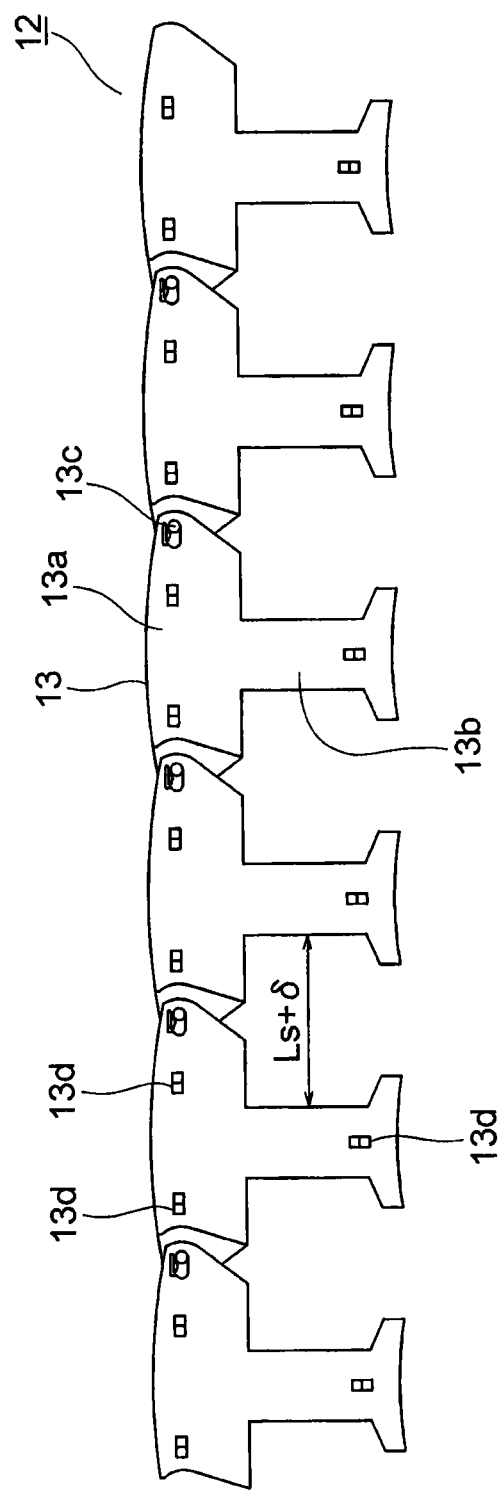
FIG. 4 is a plan that shows a state in which spacing between magnetic pole tooth portions from FIG. 3 is enlarged.
Figure 5:
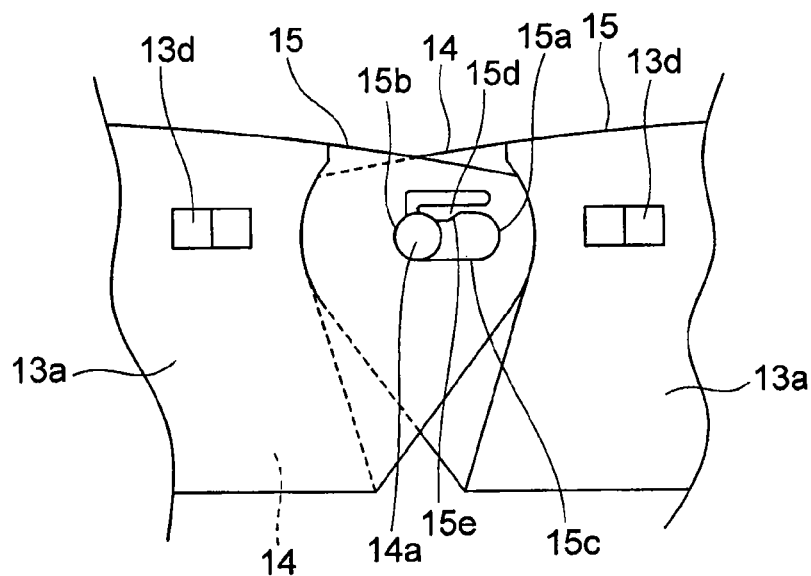
FIG. 5 is a plan that shows a vicinity of a pivot portion from FIG. 3 enlarged.
Figure 6:
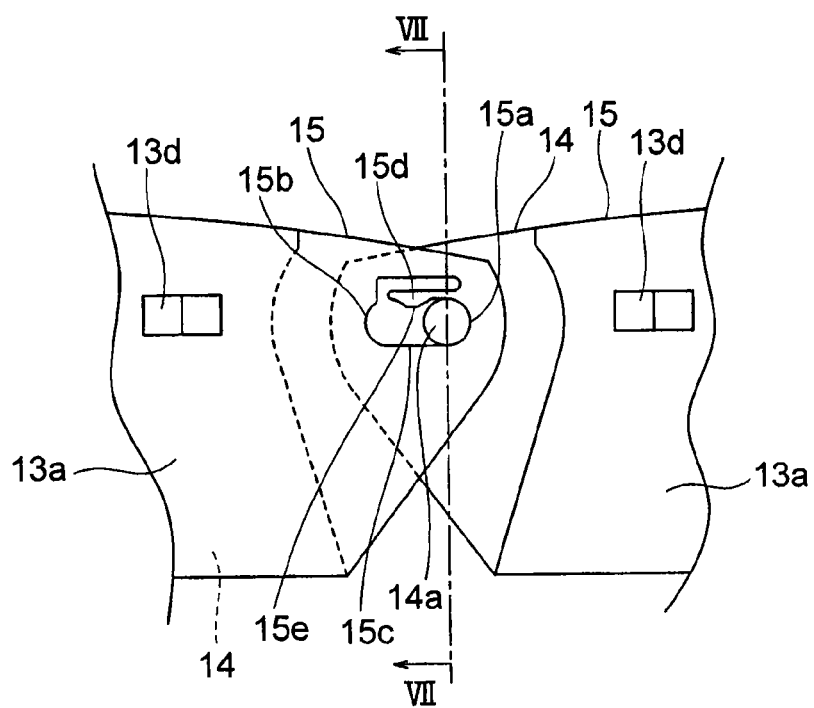
FIG. 6 is a plan that shows a vicinity of the pivot portion from FIG. 4 enlarged.
Figure 7:
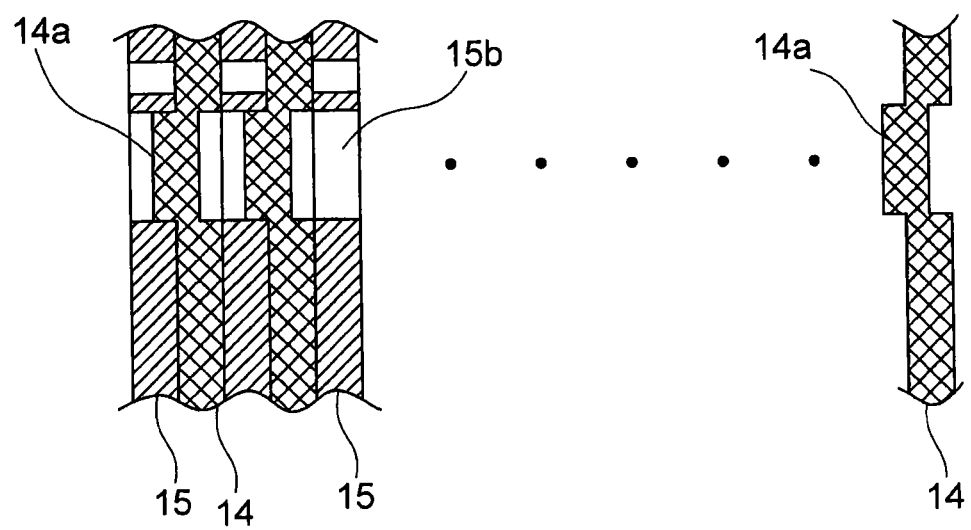
FIG. 7 is a cross section that is taken along line VII-VII in FIG. 6.

FIG. 5 is a plan that shows a vicinity of the pivot portion 13c from FIG. 3 enlarged, FIG. 6 is a plan that shows a vicinity of the pivot portion 13c from FIG. 4 enlarged, and FIG. 7 is a cross section that is taken along line VII-VII in FIG. 6. Each of the core segments 13 is configured by alternately laminating a plurality of first core segment sheets 14 and a plurality of second core segment sheets 15 that are each made from a thin sheet.

A plurality of caulking portions 13d are disposed on the respective core segment sheets 14 and 15. In this example, the caulking portions 13d are disposed at two positions on the back yoke portions 13a, and at a single position in a vicinity of tip end portions of the magnetic pole tooth portions 13b. The laminated core segment sheets 14 and 15 are fixed to each other by the caulking portions 13d.

Dowel-shaped interfitting protruding portions 14a are formed on the first core segment sheets 14 by lancing. The pivot portions 13c are constituted by the interfitting protruding portions 14a, which are aligned in columns in the axial direction of the armature 2.

First and second interfitting apertures 15a and 15b into which the interfitting protruding portions 14a are fitted selectively are disposed on the second core segment sheets 15. Linking apertures 15c that link together the first and second interfitting apertures 15a and 15b are disposed between the first interfitting aperture 15a and the second interfitting aperture 15b. The interfitting protruding portions 14a are fitted into the first interfitting apertures 15a when the core segments 13 are in the expanded position, and are fitted into the second interfitting apertures 15b when the core segments 13 are in the contracted position. The linking apertures 15c allow movement of the interfitting protruding portions 14a between the first and second interfitting apertures 15a and 15b.

The first and second interfitting apertures 15a and 15b and the linking apertures 15c are disposed at positions that correspond to the interfitting protruding portions 14a, i.e., further outward in the radial direction of the armature 2 than intermediate portions of the back yoke portions 13a.

Spring portions 15d are disposed on portions of the second core segment sheets 15 that are adjacent to the linking apertures 15c. Spring protruding portions 15e that protrude toward the linking apertures 15c, and that position the interfitting protruding portions 14a are disposed on the spring portions 15d.

The spring portions 15d are pressed outward from the linking apertures 15c by the interfitting protruding portions 14a and deform elastically when the interfitting protruding portions 14a pass through the linking apertures 15c. The spring portions 15d are restored as shown in FIGS. 5 and 6 when the interfitting protruding portions 14a are fitted into the first or second interfitting apertures 15a or 15b.

Because of that, a force that is sufficient to elastically deform the spring portions 15d is required when displacing the core segments 13 between the contracted position and the expanded position. Thus, the interfitting protruding portions 14a are positioned in the first or second interfitting apertures 15a or 15b by the spring portions 15d.

Moreover, a direction of arrangement of the first interfitting apertures 15a and the second interfitting apertures 15b is a direction that passes through a center of rotation of the rotary electric machine that is perpendicular (or approximately perpendicular) to a center line of the magnetic pole tooth portions 13b (a direction of arrangement of the core segments 13 when the core segment linked bodies 12 are opened out rectilinearly as in FIG. 3).

Next, a method for manufacturing the core segment linked bodies 12 will be explained. The core segment linked bodies 12 are manufactured using a materials layout such as that shown in FIG. 8. In other words, two core segment linked bodies 12 are manufactured as an assemblage in the state in FIG. 8. Here, the magnetic pole tooth portions 13b of a second core segment linked body 12-2, which is one of the core segment linked bodies 12, is disposed between the magnetic pole tooth portions 13b of a first core segment linked body 12-1, which is another of the core segment linked bodies 12.

Each of the core segment linked bodies 12 is opened out rectilinearly such that the magnetic pole tooth portions 13b are parallel (or approximately parallel) to each other. In addition, the respective core segments 13 are positioned in the expanded position, the respective interfitting protruding portions 14a thereby being fitted into the first interfitting apertures 15a.

Figure 8:
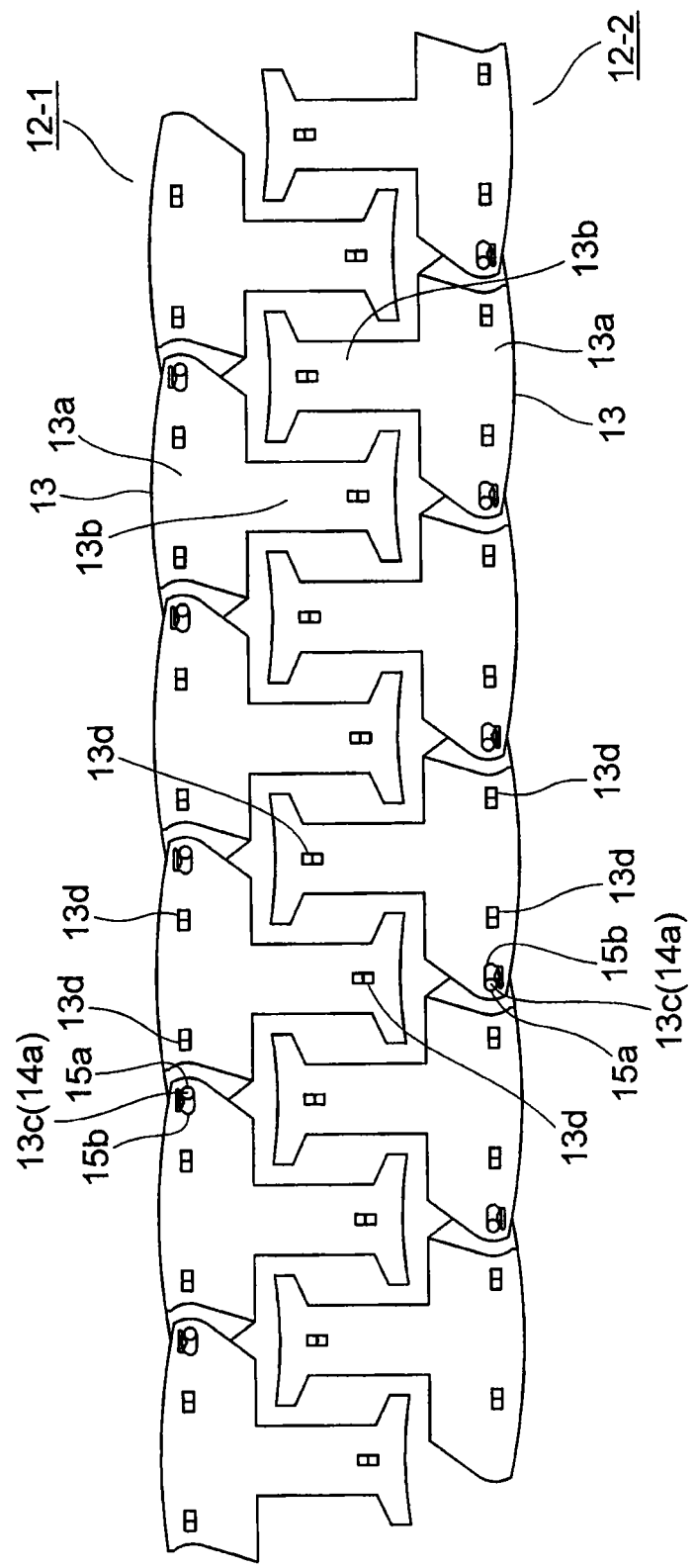
FIG. 8 is a plan that shows a state immediately after assembly of the core segment linked body from FIG. 2.
Figure 9:
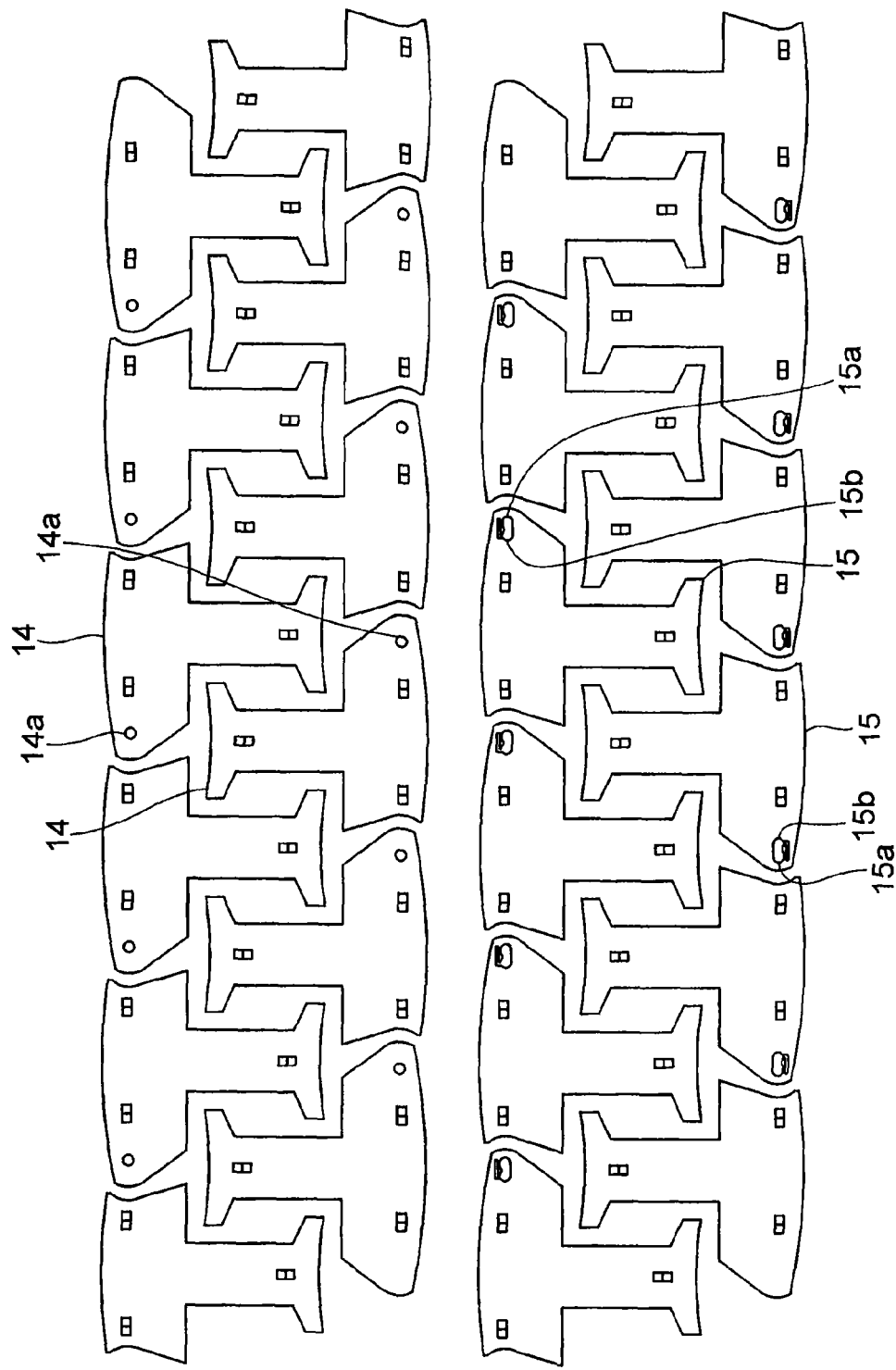
FIG. 9 is a plan that shows a portion of first and second core segment sheets that constitute the core segment linked body in FIG. 8.

Core segment linked bodies 12 such as those in FIG. 8 are obtained by laminating first and second core segment sheet 14 and 15 that are arranged as shown in FIG. 9, and fixing them at the caulking portions 13d. In the state in FIG. 9, the first core segment sheets 14 that correspond to the first core segment linked bodies 12-1 are arranged at a predetermined spacing such that the magnetic pole tooth portions 13b are parallel (or approximately parallel) to each other.

The first core segment sheets 14 that correspond to the second core segment linked body 12-2 are disposed in a staggered pattern relative to the first core segment sheets 14 that correspond to the first core segment linked body 12-1. Specifically, the first core segment sheets 14 that correspond to the second core segment linked body 12-2 are disposed in an opposite direction to the first core segment sheets 14 that correspond to the first core segment linked body 12-1. In addition, the magnetic pole tooth portions 13b of the first core segment sheets 14 that correspond to the second core segment linked body 12-2 are disposed between the magnetic pole tooth portions 13b of the first core segment sheets 14 that correspond to the first core segment linked body 12-1.

Moreover, portions of the interfitting protruding portions 14a are omitted from the first core segment sheets 14 that are positioned at first end portions of the rows of first core segment sheets 14. Portions of the first core segment sheets 14 that are positioned at second end portions of the rows of first core segment sheets 14 that correspond to second end portions of the back yoke portion 13a are extended more than the other first core segment sheets 14.

The second core segment sheets 15 that correspond to the first core segment linked bodies 12-1 are arranged at a predetermined spacing such that the magnetic pole tooth portions 13b are parallel (or approximately parallel) to each other.

In addition, the second core segment sheets 15 that correspond to the second core segment linked body 12-2 are disposed in a staggered pattern relative to the second core segment sheets 15 that correspond to the first core segment linked body 12-1. Specifically, the second core segment sheets 15 that correspond to the second core segment linked body 12-2 are disposed in an opposite direction to the second core segment sheets 15 that correspond to the first core segment linked body 12-1. In addition, the second core segment sheets 15 that correspond to the second core segment linked body 12-2 are disposed between the magnetic pole tooth portions 13b of the second core segment sheets 15 that correspond to the first core segment linked body 12-1.

Moreover, the first and second interfitting apertures 15a and 15b and the linking apertures 15c are not disposed on the second core segment sheets 15 that are positioned at a first end portion of the rows of second core segment sheets 15.

Figure 10:
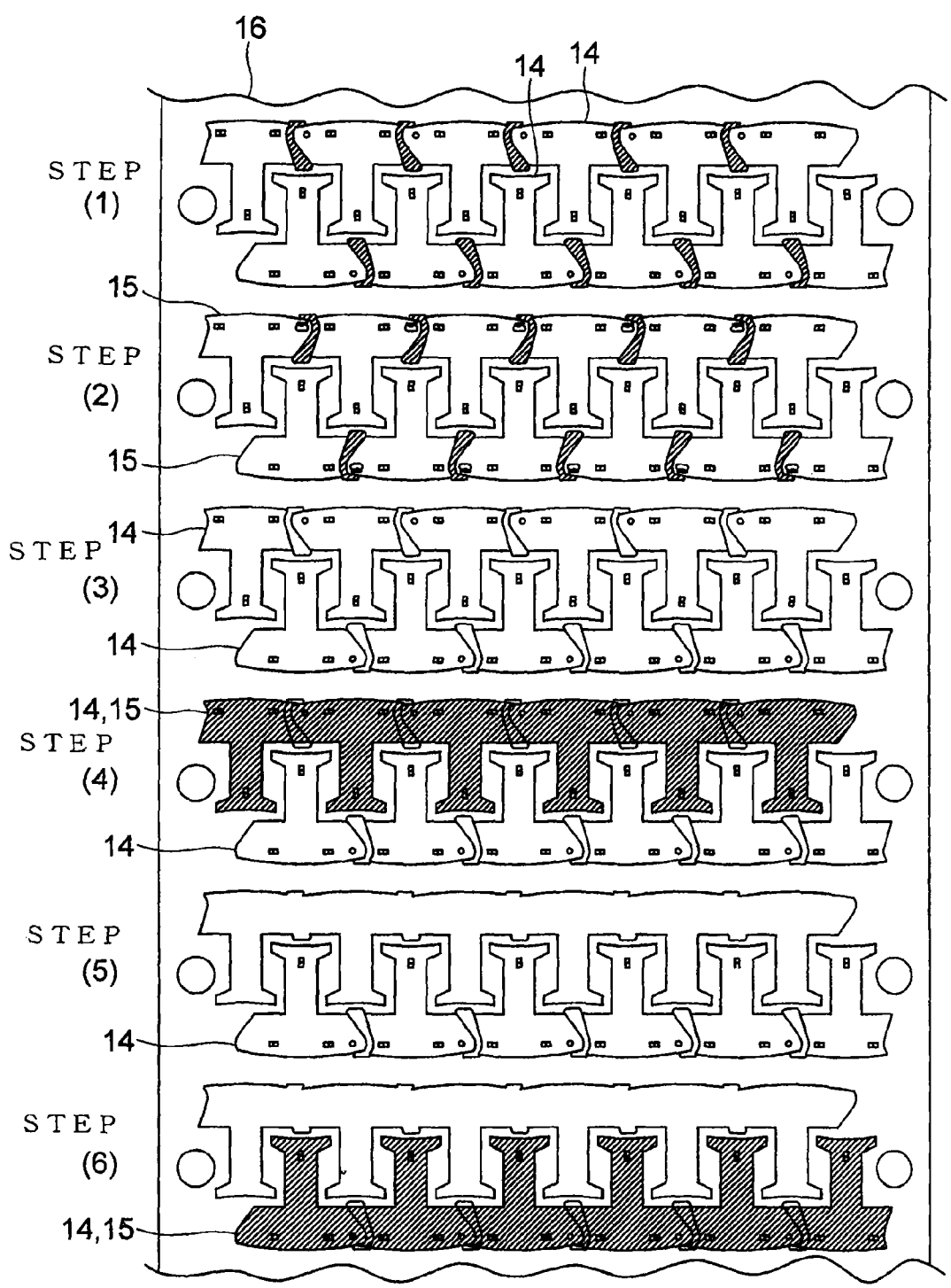
FIG. 10 is a plan that shows steps in manufacturing the first and second core segment sheets in FIG. 9.

FIG. 10 is a plan that shows steps in manufacturing the first and second core segment sheets 14 and 15 in FIG. 9, hatched portions being machined positions in each of the steps. The first and second core segment sheets 14 and 15 are manufactured by applying pressing to magnetic steel sheets 16 such as electromagnetic steel sheets.

Specifically, Step (1) is a step of removing slits from the rows of first core segment sheets 14 that correspond to the first core segment linked body 12-1 and the rows of first core segment sheets 14 that correspond to the second core segment linked body 12-2 in order to separate the mutually adjacent back yoke portions 13a from each other.

Step (2) is a step of removing slits from the rows of second core segment sheets 15 that correspond to the first core segment linked body 12-1 and the rows of second core segment sheets 15 that correspond to the second core segment linked body 12-2 in order to separate the mutually adjacent back yoke portions 13a from each other.

Steps (3) and (5) are vacant steps, in which no machining is applied, that are disposed in order to stabilize the magnetic steel sheets 16.

Step (4) is a general punching step in which the first core segment sheets 14 and the second core segment sheets 15 that correspond to the first core segment linked body 12-1 are punched out. In Step (4), the first core segment sheets 14 and the second core segment sheets 15 that correspond to the first core segment linked body 12-1 are laminated, and are joined together and fixed at the caulking portions 13d, and the interfitting protruding portions 14a of the first core segment sheets 14 are fitted into the first interfitting apertures 15a of the second core segment sheets 15.

Step (6) is a general punching step in which the first core segment sheets 14 and the second core segment sheets 15 that correspond to the second core segment linked body 12-2 are punched out. In Step (6), the first core segment sheets 14 and the second core segment sheets 15 that correspond to the second core segment linked body 12-2 are laminated, and are joined together and fixed at the caulking portions 13d, and the interfitting protruding portions 14a of the first core segment sheets 14 are fitted into the first interfitting apertures 15a of the second core segment sheets 15.

By manufacturing using steps of this kind, punching the core segment linked bodies 12 together in two staggered straight rows can be achieved.

Figure 11:
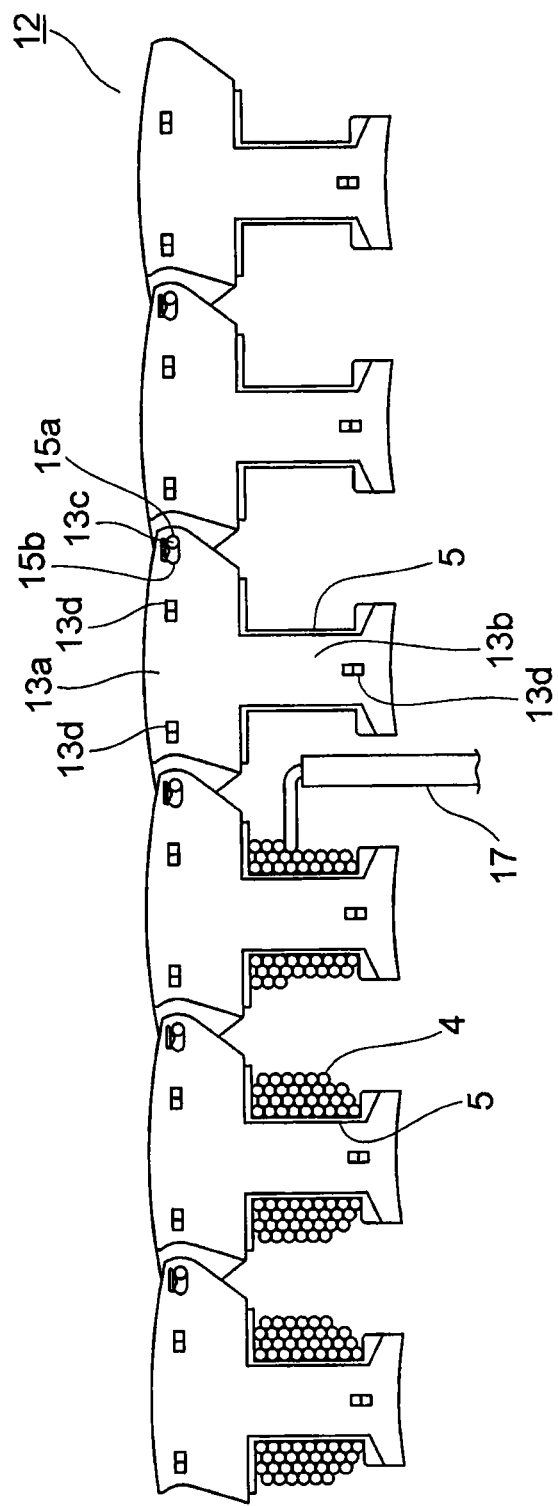
FIG. 11 is a plan that shows an intermediate state during formation of armature coils on the core segment linked body from FIG. 4.

Next, a method for manufacturing the armature 2 will be explained. After manufacturing the core segment linked bodies 12 as described above, insulators 5 are mounted onto the magnetic pole tooth portions 13b, and armature coils 4 are formed by rotating a winding nozzle 17 of a winding machine, as shown in FIG. 11.

Figure 12:
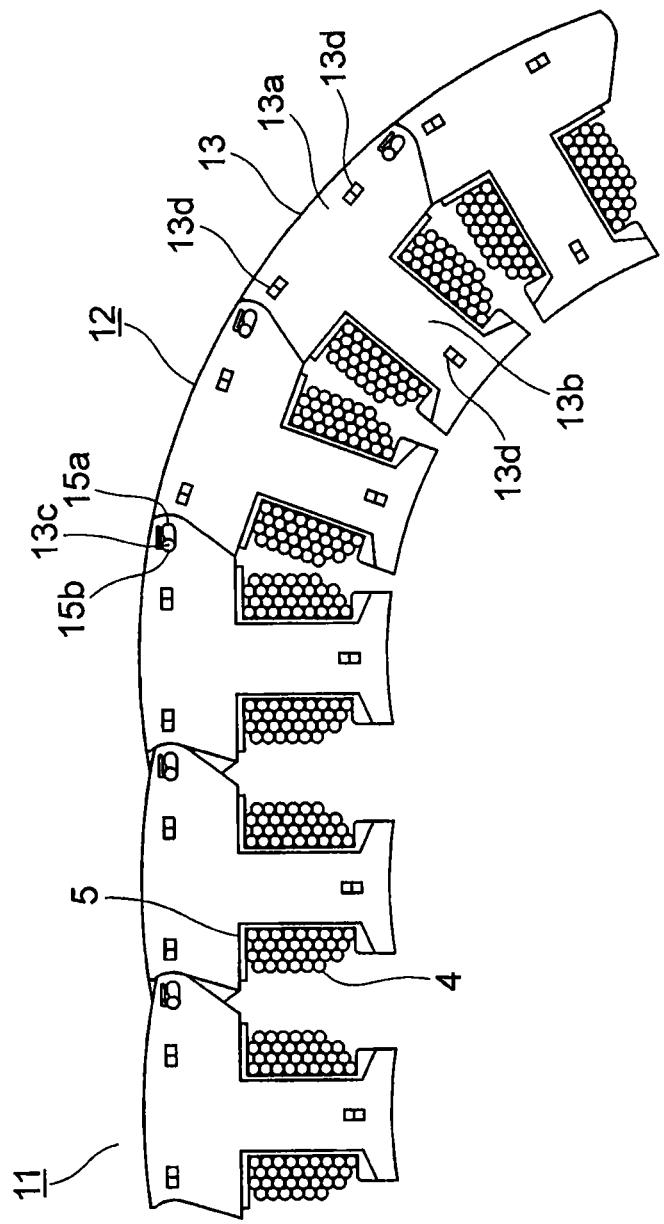
FIG. 12 is a plan that shows an intermediate state during deformation of the core segment linked body after forming the armature coils on all of the magnetic pole tooth portions in FIG. 11.

After the armature coils 4 are formed on all of the magnetic pole tooth portions 13b of the core segment linked bodies 12, the core segments 13 are moved to the contracted position, and the respective core segments 13 are rotated around the pivot portions 13c, as shown in FIG. 12. Thus, the armature segments 11 are deformed into circular arc shapes such as those shown in FIG. 2.

Three armature segments 11 are then fitted together into an annular shape, and the end portions of the armature segments 11 are fixed to each other by welding, etc. An armature 2 such as that shown in FIG. 1 can be obtained thereby.

In a core for a rotary electric machine 3 of this kind, because the core segments 13 are displaceable between an expanded position and a contracted position relative to the adjacent core segments 13, punching two staggered straight rows of core segment linked bodies 12 together can be easily achieved by manufacturing the core segment linked bodies 12 with the core segments 13 positioned in the expanded position.

Specifically, the spacing between the magnetic pole tooth portions 13b when the core segments 13 are in the contracted position is narrower than a maximum width of the magnetic pole tooth portions 13b. In contrast to that, the spacing between the magnetic pole tooth portions 13b when the core segments 13 are in the expanded position is wider than the maximum width of the magnetic pole tooth portions 13b. Because of that, punching two staggered straight rows of core segment linked bodies 12 together can be easily achieved by manufacturing the core segment linked bodies 12 with the core segments 13 positioned in the expanded position.

Materials yield of the magnetic steel sheet 16 is improved thereby, enabling manufacturing costs to be suppressed. Furthermore, by performing mounting of the insulators 5 and mounting (winding) of the armature coils 4 when the spacing between the magnetic pole tooth portions 13b is widened, sufficient space can be ensured for each of the mounting operations, enabling workability to be improved.

In addition, because the interfitting protruding portions 14a of the core segments 13 that are linked to each other fit into the first or second interfitting apertures 15a or 15b and will not dislodge (will not separate), handling is facilitated.

In addition, because resistance to movement of the interfitting protruding portions 14a from the second interfitting apertures 15b toward the first interfitting apertures 15a is imposed by the spring portions 15d, the core segments 13 that are moved to the contracted position can easily be prevented from returning to the expanded position, enabling productivity to be improved.

Figure 13:
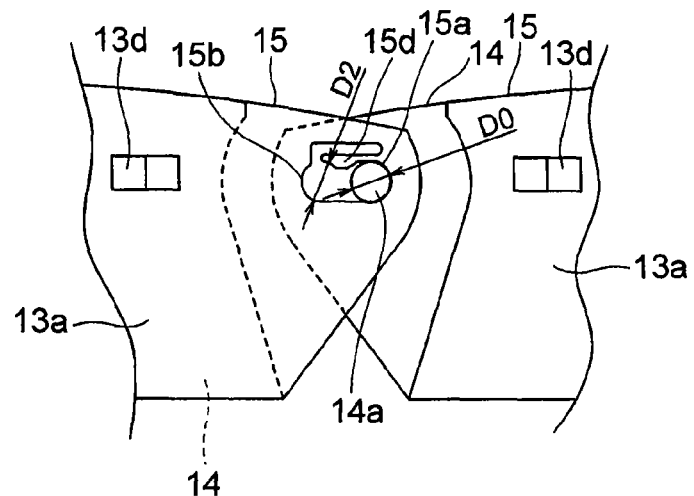
FIG. 13 is a plan that shows a relationship between an outside diameter of an interfitting protruding portion and an inside diameter of a second interfitting aperture from FIG. 6.
Figure 14:
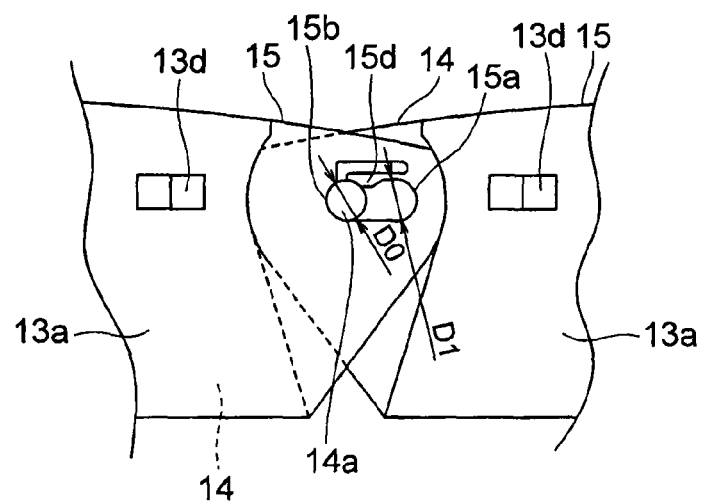
FIG. 14 is a plan that shows a relationship between the outside diameter of the interfitting protruding portion and an inside diameter of a first interfitting aperture from FIG. 5.

Moreover, in the above example, as shown in FIGS. 13 and 14, a relationship among an outside diameter D0 of the interfitting protruding portions 14a, an inside diameter D1 of the first interfitting apertures 15a, and an inside diameter D2 of the second interfitting apertures 15b is approximately $D0=D1=D2$. In contrast to that, the relationship may alternatively be set to $D0<D2<D1$, as shown in FIG. 15, for example.

Figure 15:
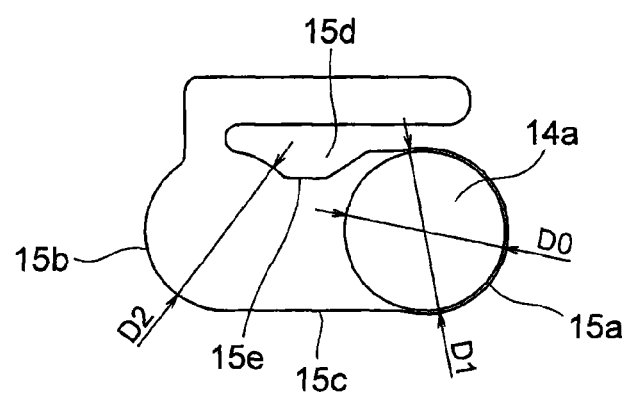
FIG. 15 is a partial enlargement that shows a variation in which the relationship among the outside diameter of the interfitting protruding portion, the inside diameter of the first interfitting aperture, and the inside diameter of the second interfitting aperture from FIG. 13 is changed.

According to the configuration that is shown in FIG. 15, the interfitting protruding portions 14a can be easily fitted into the first interfitting apertures 15a when laminating the first core segment sheets 14 and the second core segment sheets 15.

Because there is an allowance for the outside diameter D0 of the interfitting protruding portions 14a in the inside diameter D1 of the first interfitting apertures 15a, the influence of positioning errors between the interfitting protruding portions 14a and the first interfitting apertures 15a is reduced, enabling deformation of the interfitting protruding portions 14a and the first interfitting apertures 15a due to positioning errors to be suppressed. Positioning errors of the pivot portions 13c can also be reduced when the interfitting protruding portions 14a are fitted into the second interfitting apertures 15b. Consequently, the core segment linked bodies 12 can be manufactured precisely.

Embodiment 2

Figure 16:
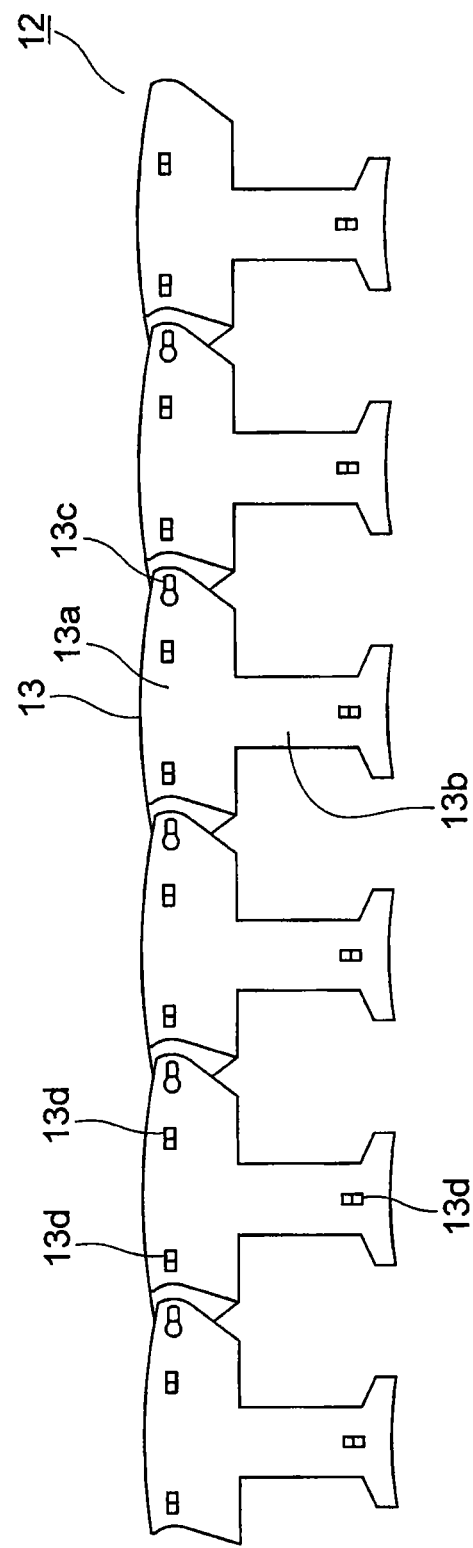
FIG. 16 is a plan that shows a core segment linked body according to Embodiment 2 of the present invention.
Figure 17:
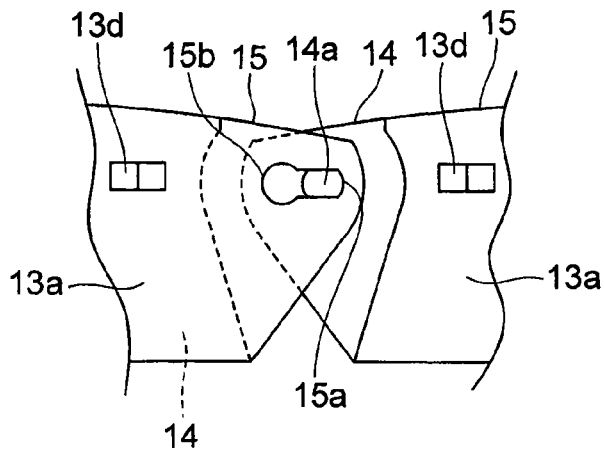
FIG. 17 is a plan that shows a vicinity of a pivot portion from FIG. 16 enlarged.
Figure 18:
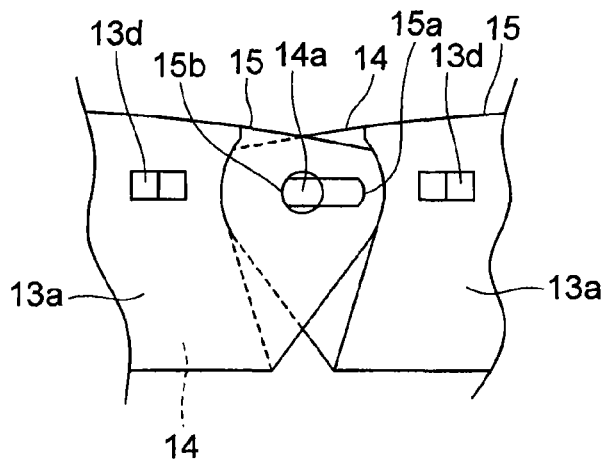
FIG. 18 is a plan that shows a state in which a core segment from FIG. 17 is displaced to a contracted position relative to an adjacent core segment.

Next, FIG. 16 is a plan that shows a core segment linked body according to Embodiment 2 of the present invention, FIG. 17 is a plan that shows a vicinity of a pivot portion 13c from FIG. 16 enlarged, and FIG. 18 is a plan that shows a state in which a core segment 13 from FIG. 17 is displaced to a contracted position relative to an adjacent core segment 13, the figures corresponding to FIGS. 4, 6, and 5, respectively, of Embodiment 1.

In Embodiment 1, a frontal shape (a shape when viewed parallel to an axial direction of the rotary electric machine) of the interfitting protruding portions 14*a* was circular, in Embodiment 2, a frontal shape of interfitting protruding portions 14*a* is a track shape that has a pair of rectilinear portions that face each other (a running track shape that is a shape in which circular arcs on a circumference of a common circle that face each other and have identical length are joined by two parallel straight lines or a shape in which two mutually facing sides of a rectangle are curved so as to be outwardly convex).

First interfitting apertures 15*a* have a track shape (or are rectangular), and have a pair of rectilinear portions that correspond to the rectilinear portions of the interfitting protruding portions 14*a*. Thus, rotation of core segments 13 relative to adjacent core segments 13 is prevented when the interfitting protruding portions 14*a* are fitted into the first interfitting apertures 15*a*.

Figure 19:
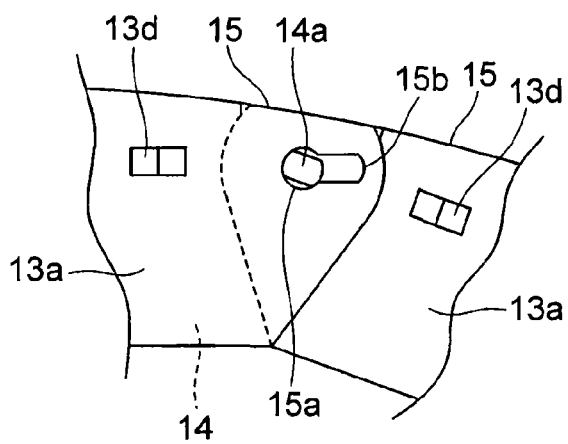
FIG. 19 is a plan that shows a state in which the core segment from FIG. 18 is rotated relative to the adjacent core segment.

Second interfitting apertures 15*b* have a circular shape that is similar or identical to that of Embodiment 1. Thus, rotation of the core segments 13 relative to the adjacent core segments 13 is permitted when the interfitting protruding portions 14*a* are fitted into the second interfitting apertures 15*b*, as shown in FIG. 19. The spring portions 15*d* and the spring protruding portions 15*e* of Embodiment 1 are not disposed in Embodiment 2.

Figure 20:
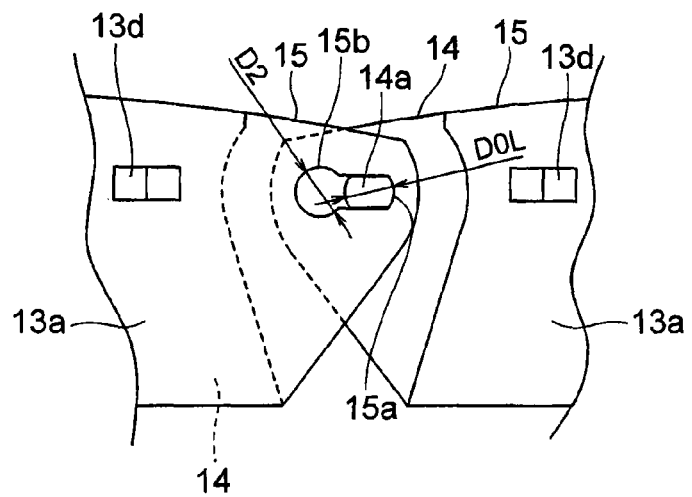
FIG. 20 is a plan that shows a relationship between a longitudinal diameter of an interfitting protruding portion and an inside diameter of a second interfitting aperture from FIG. 17.
Figure 21:
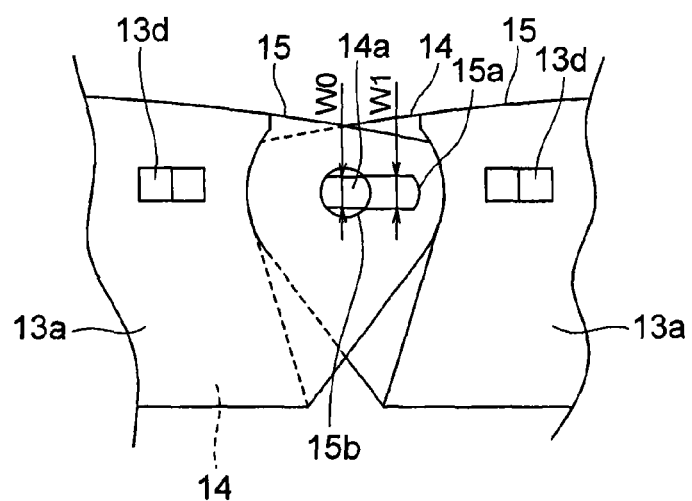
FIG. 21 is a plan that shows a relationship between a width dimension of the interfitting protruding portion and a width dimension of a first interfitting aperture from FIG. 18.
Figure 22:
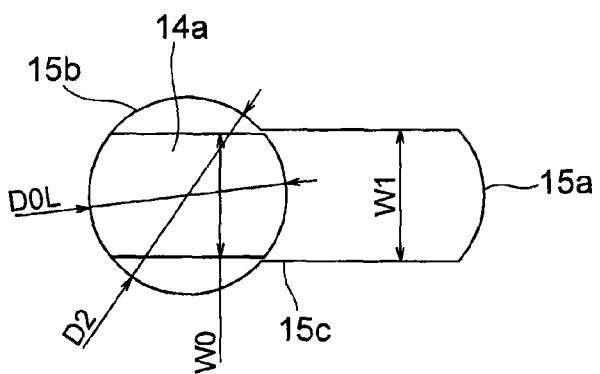
FIG. 22 is a partial enlargement of FIG. 21.

FIG. 20 is a plan that shows a relationship between a longitudinal diameter of the interfitting protruding portions 14*a* and an inside diameter of the second interfitting apertures 15*b* from FIG. 17, FIG. 21 is a plan that shows a relationship between a width dimension of the interfitting protruding portions 14*a* and a width dimension of the first interfitting apertures 15*a* from FIG. 18, and FIG. 22 is a partial enlargement of FIG. 21.

A width dimension W1 of the first interfitting apertures 15*a* is set so as to be greater than or equal to a width dimension W0 of the interfitting protruding portions 14*a* (W0≤W1). An inside diameter D2 of the second interfitting apertures 15*b* is set so as to be greater than or equal to a major axis length D0L of the interfitting protruding portions 14*a* (D0L≤D2).

A direction of arrangement of the first interfitting apertures 15*a* and the second interfitting apertures 15*b* is similar or identical to that of Embodiment 1, and a longitudinal axis of the interfitting protruding portions 14*a* is an identical direction when the core segment linked bodies 12 are opened out rectilinearly. The rest of the configuration is similar or identical to that of Embodiment 1.

In a core for a rotary electric machine 3 of this kind, the interfitting protruding portions 14*a* are positioned at the positions of second interfitting apertures 15*b* if the core segments 13 are rotated around the pivot portions 13*c* such that the core segment linked bodies 12 become circular arc-shaped when the interfitting protruding portions 14*a* are fitted into the second interfitting apertures 15*b* as shown in FIG. 19.

Consequently, by using interfitting protruding portions 14*a* that have a track shape, the interfitting protruding portions 14*a* can be easily positioned by the second interfitting apertures 15*b* using a simple configuration, enabling movement of the interfitting protruding portions 14*a* from the second interfitting apertures 15*b* toward the first interfitting apertures 15*a* to be stopped.

Embodiment 3

Figure 23:
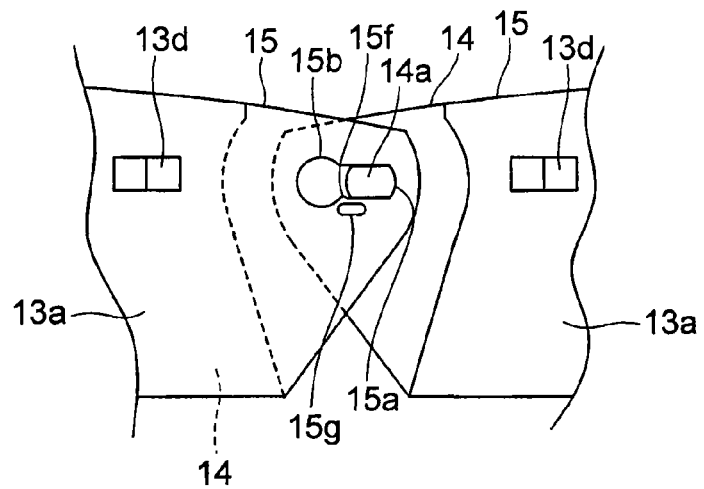
FIG. 23 is a plan that shows a vicinity of a pivot portion of a core segment linked body according to Embodiment 3 of the present invention enlarged.
Figure 24:
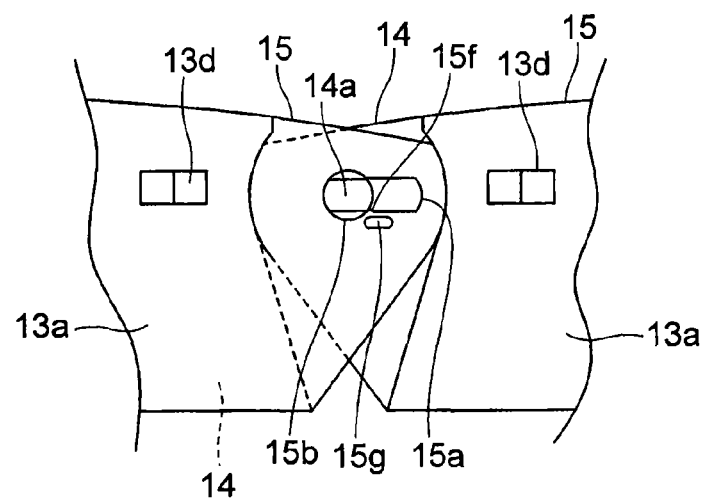
FIG. 24 is a plan that shows a state in which a core segment from FIG. 23 is displaced to a contracted position relative to an adjacent core segment.
Figure 25:
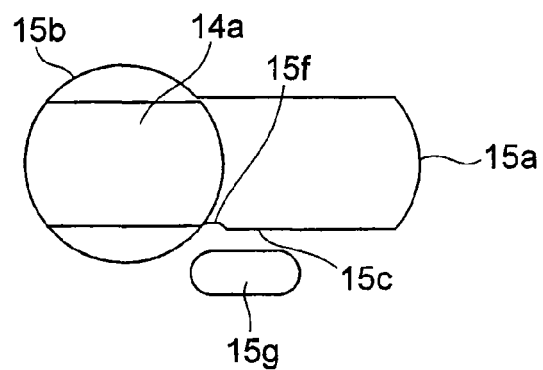
FIG. 25 is a partial enlargement of FIG. 24.

Next, FIG. 23 is a plan that shows a vicinity of a pivot portion of a core segment linked body according to Embodiment 3 of the present invention enlarged, FIG. 24 is a plan that shows a state in which a core segment 13 from FIG. 23 is displaced to a contracted position relative to an adjacent core segment 13, and FIG. 25 is a partial enlargement of FIG. 24.

A holding protruding portion 15*f* that protrudes into a linking aperture 15*c* is disposed on an edge portion of the linking aperture 15*c*. The holding protruding portion 15*f* is a projection for positioning of an interfitting protruding portion 14*a* in a second interfitting aperture 15*b*. A spring forming aperture 15*g* is disposed on a second core segment sheet 15 in a vicinity of the holding protruding portion 15*f*. Thus, a portion between the holding protruding portion 15*f* and the spring forming aperture 15*g* can be elastically deformed. The rest of the configuration is similar or identical to that of Embodiment 2.

According to a configuration of this kind, the interfitting protruding portions 14*a* can be easily positioned by the second interfitting apertures 15*b* without rotating the core segments 13, enabling movement of the interfitting protruding portions 14*a* from the second interfitting apertures 15*b* toward the first interfitting apertures 15*a* to be stopped.

Because the spring forming aperture 15*g* is disposed in the vicinity of the holding protruding portion 15*f*, the holding protruding portion 15*f* can be displaced and the interfitting protruding portion 14*a* easily passed over the holding protruding portion 15*f* when moving the interfitting protruding portions 14*a* from the first interfitting apertures 15*a* toward the second interfitting apertures 15*b*.

Embodiment 4

Figure 26:
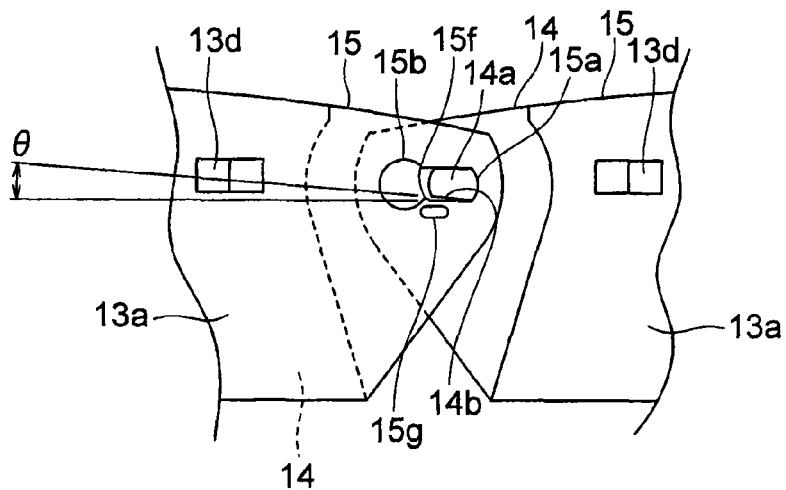
FIG. 26 is a plan that shows a vicinity of a pivot portion of a core segment linked body according to Embodiment 4 of the present invention enlarged.
Figure 27:
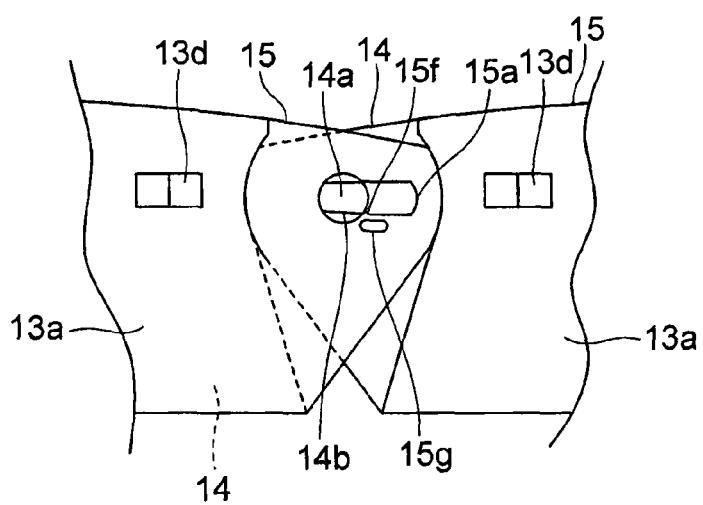
FIG. 27 is a plan that shows a state in which a core segment from FIG. 26 is displaced to a contracted position relative to an adjacent core segment.
Figure 28:
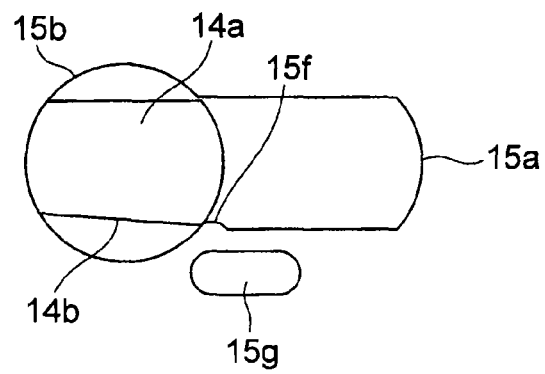
FIG. 28 is a partial enlargement of FIG. 27.

Next, FIG. 26 is a plan that shows a vicinity of a pivot portion of a core segment linked body according to Embodiment 4 of the present invention enlarged, FIG. 27 is a plan that shows a state in which a core segment 13 from FIG. 26 is displaced to a contracted position relative to an adjacent core segment 13, and FIG. 28 is a partial enlargement of FIG. 27.

In Embodiment 3, the pair of rectilinear portions in the frontal shape of the interfitting protruding portion 14*a* are mutually parallel (or approximately parallel), but in Embodiment 4, at least one of the rectilinear portions is inclined so as to form a tapered shape such that spacing between the rectilinear portions becomes gradually narrower toward a second interfitting aperture 15*b*.

Specifically, a surface of the interfitting protruding portion 14*a* near the holding protruding portion 15*f* is inclined at an angle θ away from an edge portion of the linking aperture 15*c* toward the end portion near the second interfitting aperture 15*b*. In other words, an inclined surface (a tapered portion) 14*b* is disposed on one side of the interfitting protruding portion 14*a* near the holding protruding portion 15*f*. The rest of the configuration is similar or identical to that of Embodiment 3.

According to a configuration of this kind, the interfitting protruding portion 14*a* can be easily passed over the holding protruding portion 15*f* using a small force due to a wedge effect of the inclined surface 14*b*.

Moreover, the inclined surface may instead be disposed on an opposite side of the interfitting protruding portion 14*a* from the holding protruding portion 15*f*, or inclined surfaces may be disposed on both sides.

Embodiment 5

Figure 29:
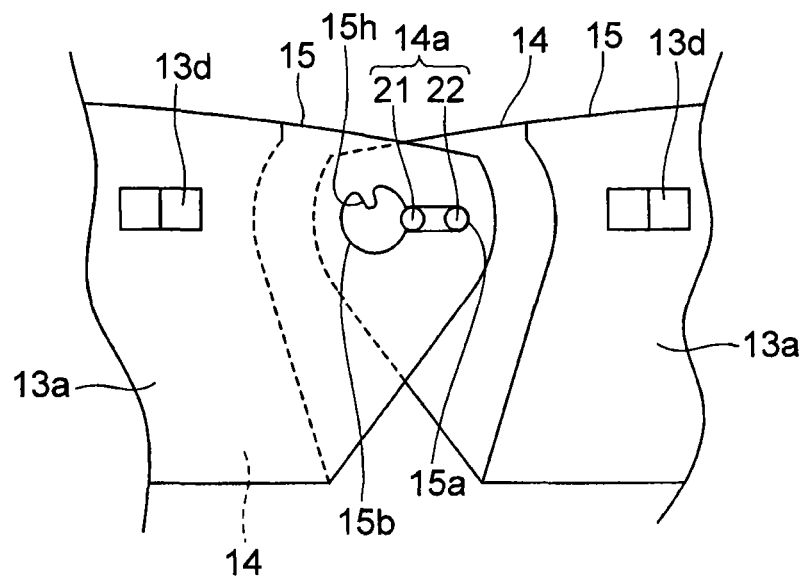
FIG. 29 is a plan that shows a vicinity of a pivot portion of a core segment linked body according to Embodiment 5 of the present invention enlarged.
Figure 30:
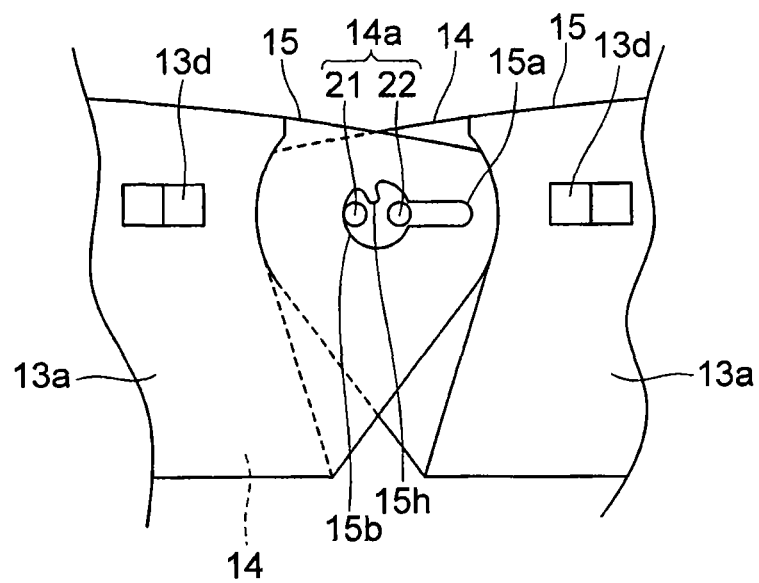
FIG. 30 is a plan that shows a state in which a core segment from FIG. 29 is displaced to a contracted position relative to an adjacent core segment.
Figure 31:
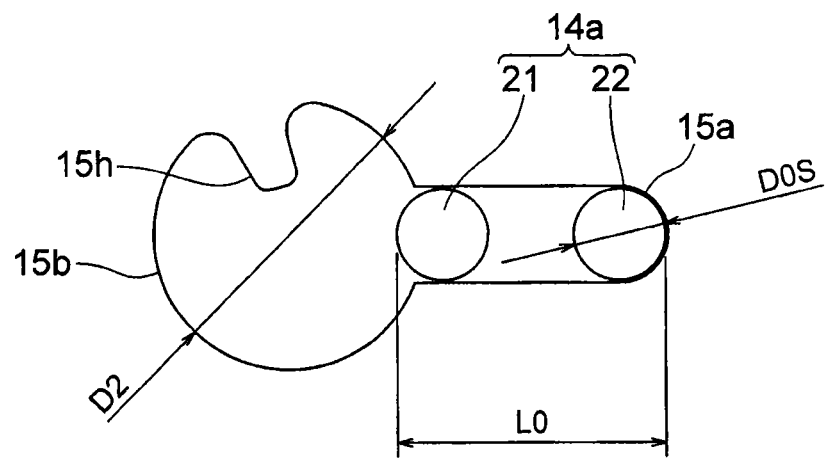
FIG. 31 is a partial enlargement of FIG. 29.
Figure 32:
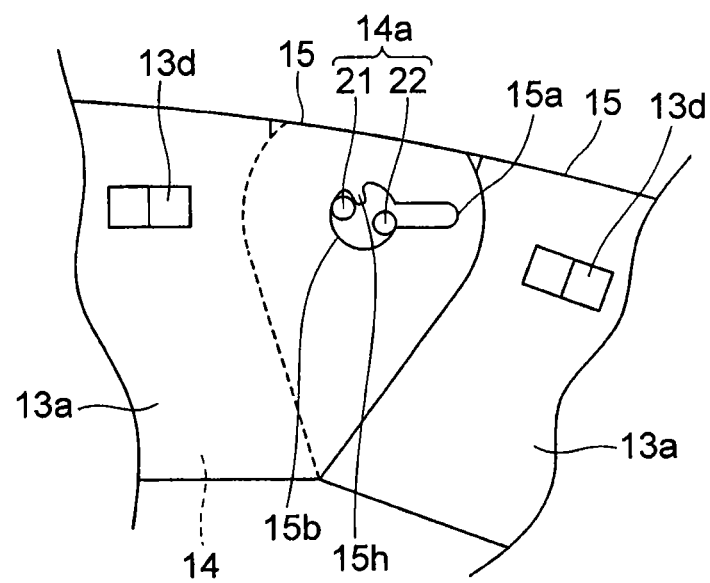
FIG. 32 is a plan that shows a state in which the core segment from FIG. 30 is rotated relative to the adjacent core segment.

Next, FIG. 29 is a plan that shows a vicinity of a pivot portion of a core segment linked body according to Embodiment 5 of the present invention enlarged, FIG. 30 is a plan that shows a state in which a core segment 13 from FIG. 29 is displaced to a contracted position relative to an adjacent core segment 13, FIG. 31 is a partial enlargement of FIG. 29, and FIG. 32 is a plan that shows a state in which the core segment from FIG. 30 is rotated relative to the adjacent core segment.

In Embodiment 5, an interfitting protruding portion 14a is divided into first and second twin interfitting protruding portions 21 and 22. The first and second twin interfitting protruding portions 21 and 22 are disposed so as to be spaced apart from each other in a direction of arrangement of core segments 13 when a core segment linked body 12 is opened out rectilinearly. In combination, the first and second twin interfitting protruding portions 21 and 22 function in a similar manner to that of the interfitting protruding portion 14a according to Embodiments 1 through 4.

An interfitting contacting portion 15h that protrudes inside a second interfitting aperture 15b is disposed on a portion of an inner circumference of the second interfitting aperture 15b. As shown in FIG. 32, the first twin interfitting protruding portion 21 comes into contact with the interfitting contacting portion 15h when a core segment 13 is rotated relative to an adjacent core segment 13.

An outside diameter D0S of the first and second twin interfitting protruding portions 21 and 22 is smaller than an inside diameter D2 of the second interfitting aperture 15b (D0S<D2). A distance (circumscribed distance) L0 between end portions on mutually distant sides of the first and second twin interfitting protruding portions 21 and 22 is less than or equal to the inside diameter D2 of the second interfitting aperture 15b.

The first interlining aperture 15a is an ellipse or a rectangle that is elongated in a direction of arrangement of the first and second twin interfitting protruding portions 21 and 22. Thus, rotation of the core segment 13 relative to the adjacent core segment 13 is prevented when the first and second twin interfitting protruding portions 21 and 22 are fitted into the first interfitting aperture 15a. The rest of the configuration is similar or identical to that of Embodiment 2.

According to a configuration of this kind, because the first twin interfitting protruding portions 21 come into contact with the interfitting contacting portions 15h as shown in FIG. 32 when the core segments 13 are rotated relative to the adjacent core segments 13 such that the core segment linked body 12 becomes a circular arc shape, the twin interfitting protruding portions 21 and 22 can be easily positioned by the second interfitting apertures 15b using a simple configuration, enabling movement of the twin interfitting protruding portions 21 and 22 from the second interfitting apertures 15b to the first interfitting apertures 15a to be prevented.

Embodiment 6

Figure 33:
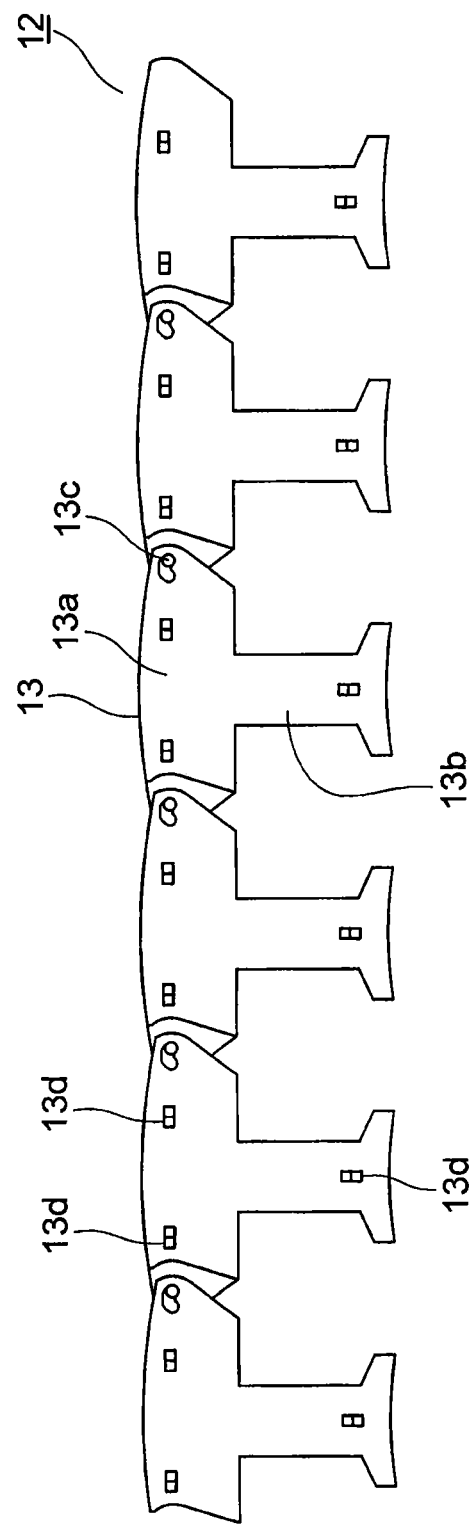
FIG. 33 is a plan that shows a core segment linked body according to Embodiment 6 of the present invention.
Figure 34:
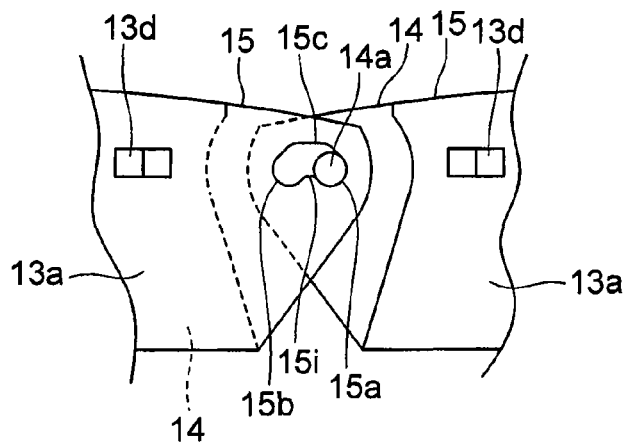
FIG. 34 is a plan that shows a vicinity of a pivot portion from FIG. 33 enlarged.
Figure 35:
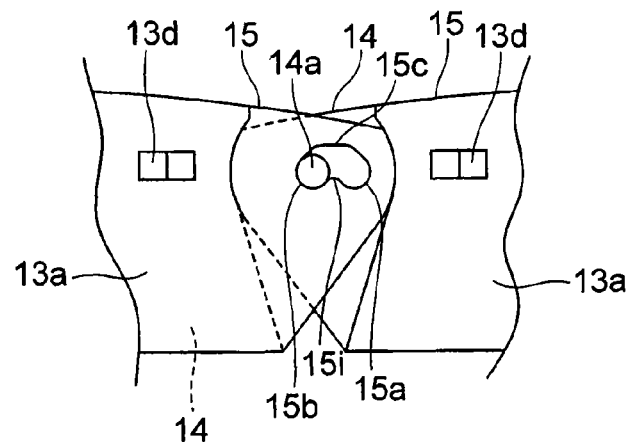
FIG. 35 is a plan that shows a state in which a core segment from FIG. 34 is displaced to a contracted position relative to an adjacent core segment.
Figure 36:
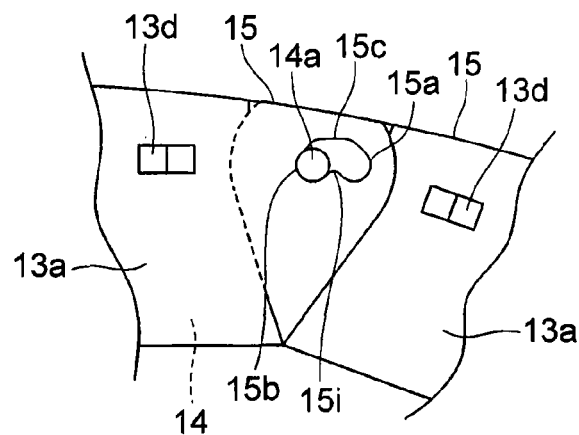
FIG. 36 is a plan that shows a state in which the core segment from FIG. 35 is rotated relative to the adjacent core segment.

Next, FIG. 33 is a plan that shows a core segment linked body according to Embodiment 6 of the present invention, FIG. 34 is a plan that shows a vicinity of a pivot portion 13c from FIG. 33 enlarged, FIG. 35 is a plan that shows a state in which a core segment 13 from FIG. 34 is displaced to a contracted position relative to an adjacent core segment 13, and FIG. 36 is a plan that shows a state in which the core segment 13 from FIG. 35 is rotated relative to the adjacent core segment 13.

An inverted-V-shaped positioning portion 15i that protrudes into a linking aperture 15c is disposed on a first edge portion of the linking aperture 15c. Spring portions 15d are not disposed on second core segment sheets 15 in Embodiment 6, and the linking aperture 15c has a shape in which the interfitting protruding portion 14a passes over the positioning portion 15i when moving between the first and second interfitting apertures 15a and 15b. The rest of the configuration is similar or identical to that of Embodiment 1.

In a core for a rotary electric machine 3 of this kind, the interfitting protruding portions 14a can be positioned in the second interfitting apertures 15b using a simpler configuration, enabling movement of the interfitting protruding portions 14a from the second interfitting apertures 15b toward the first interfitting apertures 15a to be stopped.

Moreover, in Embodiments 1 through 6 above, core segment linked bodies 12 are shown in which a core 3 is divided into three segments, but the core 3 may alternatively be divided into two segments or divided into four or more segments. If there are no manufacturing limitations, the core 3 may be constituted by a single body without being divided.

The invention claimed is:

1. A core for a rotary electric machine comprising a core segment linked body that is formed by linking a plurality of core segments that each include:
   a back yoke portion; and
   a magnetic pole tooth portion that protrudes from a central portion of the back yoke portion,
   wherein:
   each of the back yoke portions includes:
   a first end portion on which a pivot portion is disposed; and
   a second end portion;
   the first end portions of the back yoke portions are linked to the second end portions of the back yoke portions of adjacent core segments so as to be rotatable around the pivot portions;
   each of the core segments is configured by alternately laminating first core segment sheets and second core segment sheets;
   the pivot portions are constituted by a plurality of interfitting protruding portions that are formed on the first core segment sheets;
   the core segments are displaceable relative to the adjacent core segments between a contracted position in which spacing between the magnetic pole tooth portions is contracted, when the core segment linked body is opened out rectilinearly, and an expanded position in which spacing between the magnetic pole tooth portions is expanded, when the core segment linked body is opened out rectilinearly; and
   the interfitting protruding portions are retained in first interfitting apertures that are disposed on the second core segment sheets when the core segments are in the expanded position, and the interfitting protruding portions are retained in second interfitting apertures that are disposed on the second core segment sheets when the core segments are in the contracted position.

2. The core for a rotary electric machine according to claim 1, wherein the spacing between the magnetic pole tooth portions when the core segments are in the contracted position is narrower than a maximum width of the magnetic pole tooth portions, and the spacing between the magnetic pole tooth portions when the core segments are in the expanded position is wider than the maximum width of the magnetic pole tooth portions.

3. The core for a rotary electric machine according to claim 1, wherein:
   linking apertures that link the first and second interfitting apertures are respectively disposed between the first interfitting apertures and the second interfitting apertures;

a spring portion is disposed on a portion that is adjacent to each of the linking apertures; and a spring protruding portion that protrudes toward the linking aperture and that positions the interfitting protruding portion is disposed on each of the spring portions.

4. The core for a rotary electric machine according to claim 1, wherein a relationship among an outside diameter D0 of the interfitting protruding portions, an inside diameter D1 of the first interfitting apertures, and an inside diameter D2 of the second interfitting apertures is D0<D2<D1.

5. The core for a rotary electric machine according to claim 1, wherein:

a frontal shape of the interfitting protruding portions is a track shape that has a pair of rectilinear portions that face each other; and relationships among a major axis length D0L and a width dimension W0 of the frontal shape of the interfitting protruding portions, a width dimension W1 of the first interfitting apertures, and an inside diameter D2 of the second interfitting apertures are W0≤W1, and D0L≤D2.

6. The core for a rotary electric machine according to claim 5, wherein: linking apertures that link the first and second interfitting apertures are respectively disposed between the first interfitting apertures and the second interfitting apertures; and a holding protruding portion that protrudes into the linking aperture and that positions the interfitting protruding portion is disposed on an edge portion of each of the linking apertures.

7. The core for a rotary electric machine according to claim 5, wherein at least one of the rectilinear portions in the frontal shape of the interfitting protruding portion is inclined so as to form a tapered shape such that spacing between the rectilinear portions becomes gradually narrower toward the second interfitting aperture.

8. The core for a rotary electric machine according to claim 1, wherein:

the interfitting protruding portions are divided into first and second twin interfitting protruding portions that are disposed so as to be spaced apart from each other in a direction of arrangement of the core segments when the core segment linked body is opened out rectilinearly; and a relationship between a circumscribed distance L0 between the first and second twin interfitting protruding portions and an inside diameter D2 of the second interfitting apertures is L0≤D2.

9. The core for a rotary electric machine according to claim 8, wherein:

an interfitting contacting portion that protrudes into the second interfitting aperture is disposed on a portion of an inner circumference of the second interfitting apertures; and the interfitting contacting portion comes into contact with the first twin interfitting protruding portion when the core segments are rotated relative to the adjacent core segments.

10. The core for a rotary electric machine according to claim 1, wherein:

linking apertures that link the first and second interfitting apertures are respectively disposed between the first interfitting apertures and the second interfitting apertures;

an inverted-V-shaped positioning portion that protrudes into the linking aperture is disposed on one edge portion of each of the linking apertures; and the linking apertures have a shape such that the interfitting protruding portion passes over the positioning portion when moving between the first and second interfitting apertures.

11. The core for a rotary electric machine according to claim 1, wherein a direction in which the first interfitting apertures and the second interfitting apertures are arranged is a direction that is perpendicular to a center line of the magnetic pole tooth portions that passes through a center of rotation of the rotary electric machine.

* * * * *